United States Patent [19]
Fujibayashi

[11] Patent Number: 6,101,474
[45] Date of Patent: *Aug. 8, 2000

[54] VOICE RECORDING/REPRODUCING APPARATUS

[75] Inventor: Kenji Fujibayashi, Tokyo, Japan

[73] Assignee: Olympus Optical Ltd., Co., Tokyo

[ * ] Notice: This patent issued on a continued prosecution application filed under 37 CFR 1.53(d), and is subject to the twenty year patent term provisions of 35 U.S.C. 154(a)(2).

[21] Appl. No.: 08/671,967

[22] Filed: Jun. 28, 1996

[30] Foreign Application Priority Data

Jun. 30, 1995 [JP] Japan .................................. 7-166435

[51] Int. Cl.$^7$ ....................................... H04B 1/20
[52] U.S. Cl. ................................ 704/278; 381/81; 369/2
[58] Field of Search ..................................... 704/233, 248, 704/278, 502; 455/186.1, 205; 369/2; 381/81

[56] References Cited

U.S. PATENT DOCUMENTS

| | | | |
|---|---|---|---|
| 4,127,880 | 11/1978 | Emmert | 360/68 |
| 4,450,589 | 5/1984 | Eilers et al. | 455/205 |
| 4,604,659 | 8/1986 | Itoh et al. | 360/38.1 |
| 4,858,217 | 8/1989 | Fujiie et al. | 369/59 |
| 5,345,344 | 9/1994 | Kim | 360/64 |
| 5,349,699 | 9/1994 | Erben et al. | 455/186.1 |
| 5,432,657 | 7/1995 | Akama | 360/74.1 |
| 5,586,216 | 12/1996 | Degen et al. | 395/2.85 |
| 5,596,651 | 1/1997 | Yamaguchi | 381/104 |

FOREIGN PATENT DOCUMENTS 63-259700 of 1988 Japan .

OTHER PUBLICATIONS

Stifelman, "VoiceNotes: an application for a voice controlled hand held computer" pp. 27 and 74, 1988.
IEEE "The IEEE standard dictionary of electrical and electronics terms" 1996, IEEE p. 113.

Primary Examiner—David R. Hudspeth
Assistant Examiner—Harold Zintel
Attorney, Agent, or Firm—Louis Weinstein

[57] ABSTRACT

A voice recording/reproducing apparatus includes
an A/D converting circuit for converting an input analog voice signal into a digital signal;
a digital signal processing circuit for coding the converted digital signal in a predetermined format and decoding the coded voice data;
a recording medium for storing the coded voice data;
a buffer memory;
a D/A converter for converting the decoded digital signal stored in the recording medium into an analog voice signal;
an operation unit for setting a predetermined mode; and
a control circuit for performing a predetermined process for reducing noise in a reproducing operation to the voice data obtained from time a predetermined period of time before the operation unit recognizes that a recording stop operation is performed by the operation unit during a recording operation to time when the operation unit recognizes that the recording stop operation is performed whereby the noise due to a stop operation is reduced when the voice data is in said buffer memory and then transferred to the recording medium.

22 Claims, 9 Drawing Sheets

VOICE RECORDING/REPRODUCING APPARATUS

BACKGROUND OF THE INVENTION

1. Field of the Invention

The present invention relates to a voice recording/reproducing apparatus and, more particularly, to a voice recording/reproducing apparatus which converts a voice signal into a digital signal to store the digital signal.

2. Related Art Statement

In recent years, there is provided a recorder in which a voice signal obtained by a microphone or the like is converted into a digital signal, the digital signal is stored in, e.g., a semiconductor memory, the voice signal is read from the semiconductor memory to be converted into an analog signal in a reproducing operation, and the analog signal is output as voice by a loudspeaker or the like.

Japanese Unexamined Patent Publication No. 63-259700 discloses an example of the recorder described above. In this recorder, operation switches such as a recording operation switch, a reproducing operation switch, and a stop operation switch are arranged to set predetermined modes.

In the recorder described above, an operation sound is generated when an operation switch is operated. On the other hand, when it is assumed that the stop operation switch is operated during a recording operation, it takes a short period of time for the recorder to recognize a recording stop operation after the stop operation switch is operated.

In a small time difference caused by the time-lag, although the stop operation switch is operated, a recording operation itself continues. Therefore, the operation sound of the stop operation switch is recorded on the semiconductor memory as noise during the recording operation, and this sound creates noise in a reproducing operation.

OBJECTS AND SUMMARY OF THE INVENTION

It is a first object of the present invention to provide a voice recording/reproducing apparatus which can perform a comfortably recording operation without recording uncomfortable operation sound.

It is a second object of the present invention to provide a voice recording/reproducing apparatus which reduces uncomfortable operation sound and can naturally perform a more comfortable recording operation.

It is a third object of the present invention to provide a voice recording/reproducing apparatus which reduces uncomfortable operation sound and can perform a comfortable reproducing operation.

Briefly, the voice recording/reproducing apparatus according to the present invention includes the following means:

A/D converting means for converting an input analog voice signal into a digital signal;

digital signal processing means for coding the converted digital signal in a predetermined format and decoding the coded voice data;

storing means for storing the coded voice data;

D/A converting means for converting the decoded digital signal into an analog voice signal;

operation means for setting a predetermined mode; and control means for performing a predetermined process for reducing noise in a reproducing operation to the voice data obtained from a predetermined period of time before the operation means recognizes that a recording stop operation is performed by the operation means during a recording operation to a time when the operation means recognizes that the recording stop operation is performed.

These as well as other objects and advantages of the present invention will become further apparent from the following detailed description.

DETAILED DESCRIPTION OF THE PREFERRED EMBODIMENTS

Embodiments of the present invention will be described below with reference to the accompanying drawings.

Figure 1:
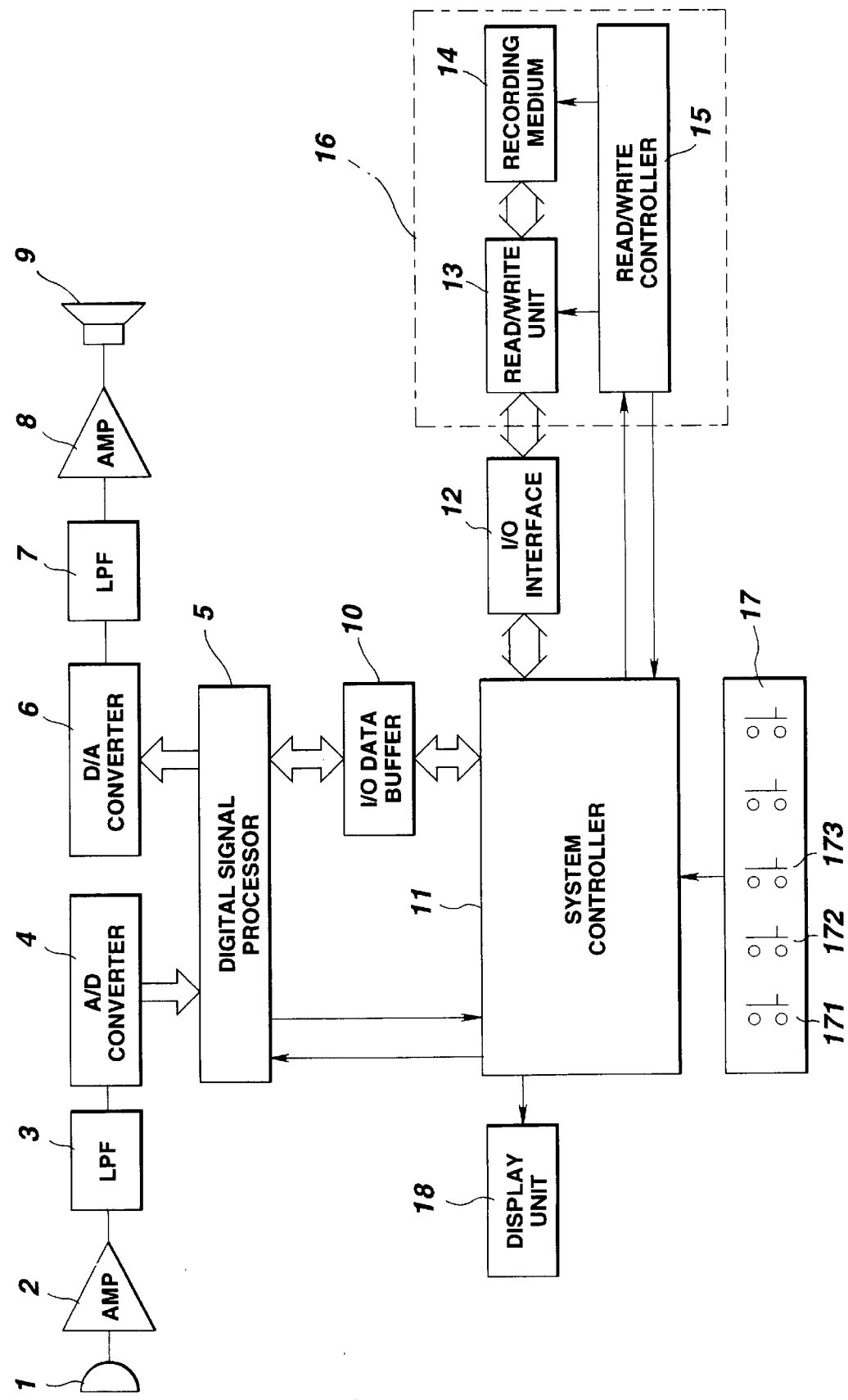
FIG. 1 is a block diagram showing the arrangement of a voice recording/reproducing apparatus according to a first embodiment of the present invention.

FIG. 1 is a block diagram showing the arrangement of a voice recording/reproducing apparatus according to the first embodiment of the present invention.

A microphone 1 is connected to a digital signal processor 5 through a microphone amplifier 2, a low-pass filter 3, and an A/D converter 4. The digital signal processor 5 is connected to a system controller 11 through an I/O data buffer 10 and connected to a loudspeaker 9 through a D/A converter 6, a low-pass filter 7, and a power amplifier 8. The system controller 11 is connected to a display unit 18, a write/read controller 15, and an operation input unit 17, and connected to a recording medium 14 through an I/O interface 12 and a write/read unit 13. The write/read controller 15 is connected to the write/read unit 13 and the recording medium 14. The write/read unit 13, the recording medium 14, and the write/read controller 15 constitute a storage unit 16. The recording medium 14 may be built into the voice recording/reproducing apparatus, or may be detachably arranged in the voice recording/reproducing apparatus. In the operation input unit 17, various operation buttons such as a recording button 171, a stop button 172, and a reproducing button 173 are arranged.

The microphone 1 converts input voice into an analog voice signal serving as an electric signal.

The microphone amplifier 2 amplifies the analog voice signal.

The low-pass filter 3 cuts an unnecessary frequency band of an output from the microphone amplifier 2 to prevent area sink noise from being generated.

The A/D converter 4 converts an output from the low-pass filter 3 from an analog signal to a digital signal.

The digital signal processor 5 codes an output from the A/D converter 4, i.e., converts the output into data having a predetermined format. The digital signal processor 5 also decodes the coded data, i.e., converts the coded signal into the original digital signal.

The D/A converter 6 converts an output from the digital signal processor 5 from a digital signal to an analog signal.

The low-pass filter 7 cuts an unnecessary frequency band of a signal output from the D/A converter 6 to reduce quantizing noise.

The power amplifier 8 amplifies an output from the low-pass filter 7 to drive the loudspeaker 9.

The loudspeaker 9 converts an output from the power amplifier 8 into voice to output it.

The I/O data buffer 10 temporarily stores the data coded by the digital signal processor 5.

The system controller 11 is constituted by a microprocessor, and controls the operations of respective units of the voice recording/reproducing apparatus. The system controller 11 controls the digital signal processor 5 and exchanges data with the I/O data buffer 10. The system controller 11 also exchanges data with the storage unit 16 through the I/O interface 12.

The write/read controller 15 is controlled by the system controller 11, and writes/reads data in/from the recording medium 14 through the write/read unit 13.

The operation input unit 17 designates an operation mode of the voice recording/reproducing apparatus.

The display unit 18 displays the operation mode or a storage time.

A recording operation of the first embodiment will be briefly described below.

When the recording button 171 arranged in the operation input unit 17 is pressed, the system controller 11 recognizes a recording mode, and a recording operation is started. An input signal from the microphone 1 is amplified by the microphone amplifier 2, and the low-pass filter 3 cuts a predetermined frequency band of the input signal. The A/D converter 4 converts the resultant signal into a digital signal, and the digital signal is coded by the digital signal processor 5 and sequentially stored in the I/O data buffer 10.

The input signal is read from the I/O data buffer 10 by the system controller 11, converted by the I/O interface 12 into a signal having a specification adapted for the storage unit 16, sent to the write/read unit 13, and stored in the recording medium 14.

The display unit 18 displays that a recording mode is set at present, and an elapsed time of a recording operation.

An operation performed when the stop button 172 is pressed in the recording mode, which operation is a characteristic feature of this embodiment, will be described below. Voice input to the microphone 1 at this time will be described below with reference to FIG. 2.

Figure 2:
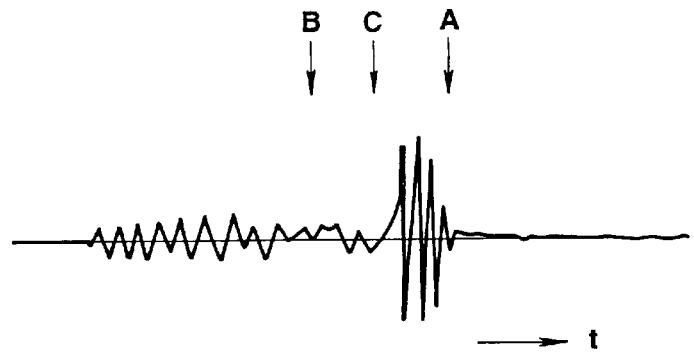
FIG. 2 is a graph showing voice input to a microphone in the voice recording/reproducing apparatus according to the first embodiment.

FIG. 2 is a graph showing a voice waveform input to the microphone 1 when the stop button 172 is pressed in the recording mode. In FIG. 2, the abscissa indicates a time axis, and time elapses from left to right along the time axis. It is assumed that, when the voice having the waveform shown in FIG. 2 is input to the microphone 1 of the voice recording/reproducing apparatus of the first embodiment, the microphone 1 outputs a voice signal having almost the same waveform as that of the input voice.

Since voice data is temporarily stored in the I/O data buffer 10, there is a time-lag between time when voice is input to the microphone 1 and time when data is stored in the storage unit 16. For example, when the present point is represented by A, voice at a point A is input to the microphone 1, data at a point B is stored in the storage unit 16.

Referring to FIG. 2, the point A is a point at which the system controller 11 recognizes that the stop button 172 is pressed to stop a recording operation in a prior art means. As is apparent from FIG. 2, immediately before the point A, large noise generated by pressing the stop button 172 is input to the microphone 1. The large noise generated by pressing the stop button 172 is noisy sound which is not included in a desired voice signal. In a voice recording/reproducing apparatus in which sound input to a microphone is recorded in real time in the prior art means, this noise is recorded.

In order to prevent the noise from being reproduced, the noise is recorded from the beginning. The present invention has been made in consideration of this point. For example, the present invention has the following characteristic feature. That is, a recording operation is stopped up to a point C in FIG. 2 to prevent the noise from being recorded.

Figure 3:
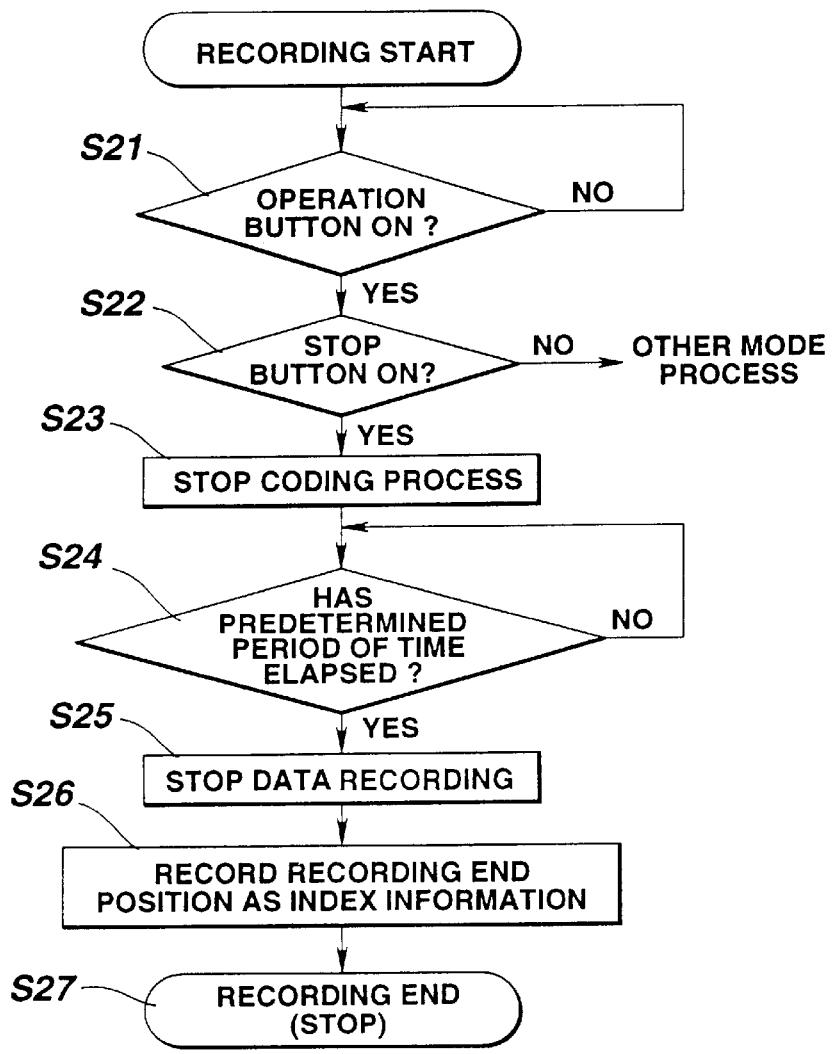
FIG. 3 is a flow chart showing a recording operation in the voice recording/reproducing apparatus according to the first embodiment.

Of operations of the voice recording/reproducing apparatus according to the first embodiment, a recording operation will be described below with reference to the flow chart in FIG. 3.

Recording is started first.

It is detected in step S21 whether the operation buttons of the operation input unit 17 are ON during the recording process. When the operation buttons are ON, the flow is shifted to step S22.

It is detected in step S22 whether the stop button 172 of the operation buttons is ON. If NO in step S22, another mode process is started. If YES in step S22, the flow is shifted to step S23.

In step S23, a coding stop process is performed. The flow is shifted to step S24.

In step S24, when a predetermined period of time has elapsed, flow is shifted to step S25.

In step S25, data storing is stopped. The flow is shifted to step S26.

In step S26, a recording end position is stored as index information. The flow is shifted to step S27.

In step S27, recording is stopped to set a stop mode.

In this manner, according to the first embodiment, a predetermined period of time after, i.e., before all the data in the I/O data buffer 10 are stored in the recording medium 14, recording is ended.

The above operation will be described below with reference to FIG. 2. When data obtained at the point B is being recorded when it is detected that the stop button 172 is pressed, data obtained from the point B to the point A are stored in the I/O data buffer 10. In the first embodiment, storing is stopped when data obtained from the point B to the point C are completely stored in the recording medium 14 a predetermined period of time after, and noise generated between the point C and the point A is prevented from being recorded.

Figure 12:
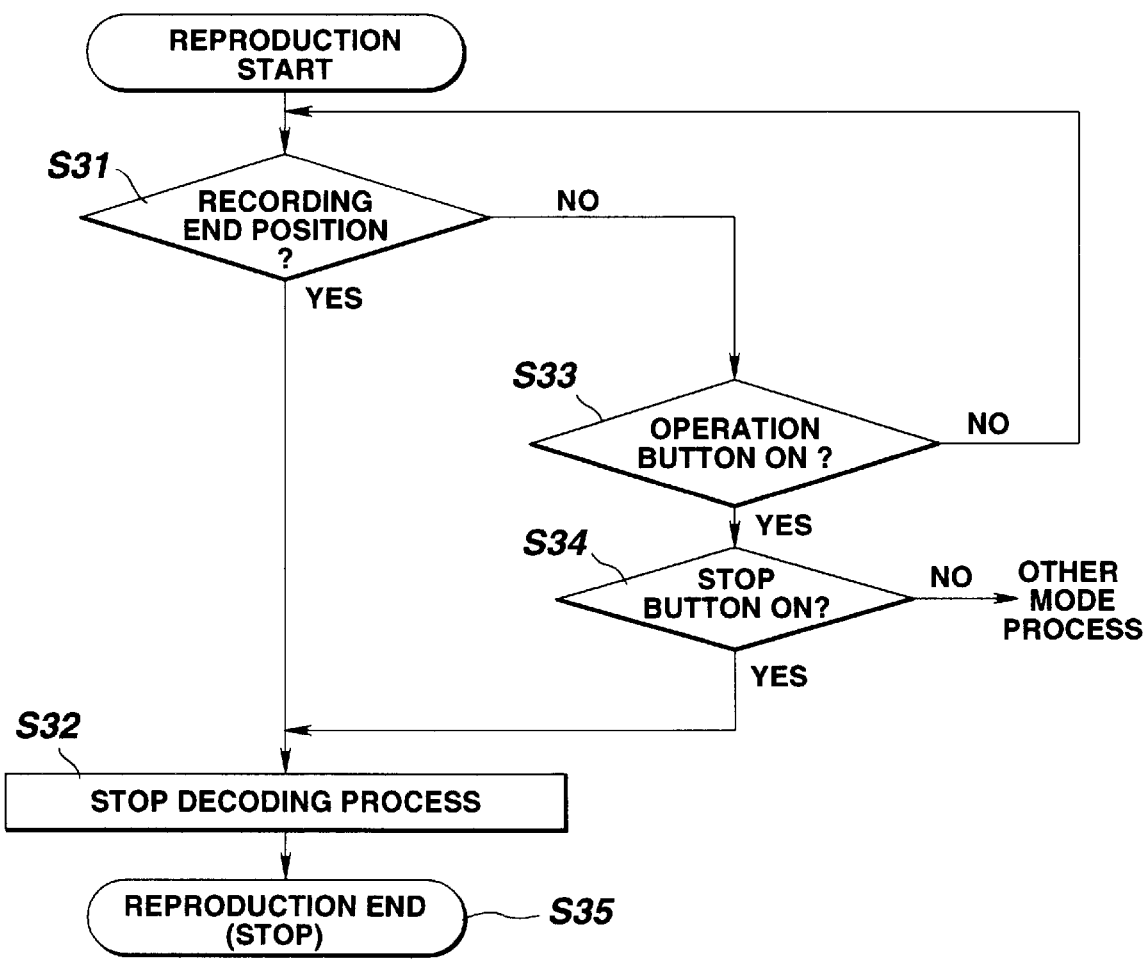
FIG. 12 is a flow chart showing a reproducing operation in the voice recording/reproducing apparatus according to the first embodiment.

Of operations of the voice recording/reproducing apparatus according to the first embodiment, a reproducing operation will be described below with reference to the flow chart in FIG. 12.

A reproducing operation is started.

It is detected in step S31 whether the recording end position of the index information stored in the storage unit 16 reaches during the reproducing process. If NO in step S31, the flow is shifted to step S33.

It is detected in step S33 whether the operation button is ON. If NO in step S33, the flow returns to step S31. If YES in step S33, the flow is shifted to step S34.

It is detected in step S34 whether the stop button 172 is ON. If NO in step S34, another mode process is started. If YES in step S34, the flow is shifted to step S32.

If YES in step S31, a decoding process is stopped in step S32. The flow is shifted to step S35, and reproduction is ended.

With the above reproducing operation, all coded voice data which are recorded before the recording end position are decoded and reproduced as voice.

In this manner, according to the first embodiment, uncomfortable operation sound generated by pressing the stop button 172 is not recorded while predetermined voice is recorded, comfortable recording can be performed.

In the first embodiment, although a microprocessor (CPU) is proposed as the system controller 11, a gate array or a dedicated LSI may be employed. In addition, although a digital signal processor (DSP) is proposed as a means for coding/decoding a digital signal, a dedicated LSI may be employed. Although a semiconductor memory is proposed as the storage unit 16, a magnetic tape device or a magnetic disk device may be employed.

The second embodiment of the present invention will be described below.

A voice recording/reproducing apparatus according to the second embodiment has the following characteristic feature. The voice recording/reproducing apparatus employs a so-called fade-out scheme in which, back to time before noise generated by pressing the stop button 172 is input to the microphone 1, a recording level is gradually lowered.

Figure 4:
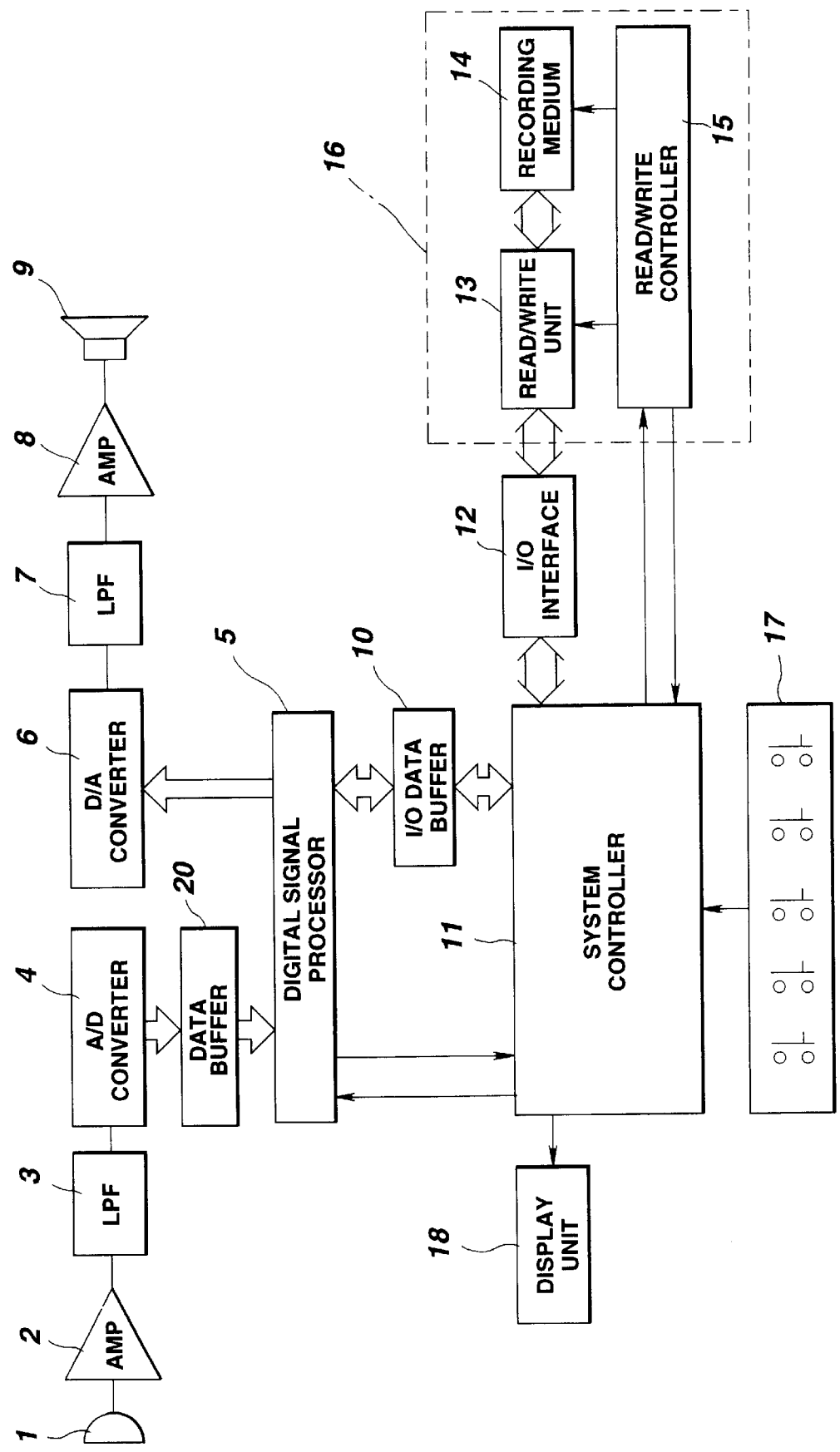
FIG. 4 is a block diagram showing the arrangement of a voice recording/reproducing apparatus according to a second embodiment of the present invention.

FIG. 4 is a block diagram showing the arrangement of the voice recording/reproducing apparatus as the second embodiment of the present invention. The same reference numerals as in the first embodiment denote the same parts in the second embodiment, a description thereof will be omitted.

As shown in FIG. 4, in addition to the arrangement in the first embodiment, a data buffer 20 is arranged between an A/D converter 4 and a digital signal processor 5. The data buffer 20 delays a voice signal digitally converted by the A/D converter 4 to input the delayed signal to the digital signal processor 5.

In the second embodiment, in the digital signal processor 5, a process using a so-called fade-out scheme in which, prior to a time before noise generated by pressing a stop button 172 is input to the microphone 1, a recording level is gradually lowered is performed.

Since the remaining arrangement and function are the same as those of the first embodiment, a description of the arrangement and the function will be omitted.

Figure 5:
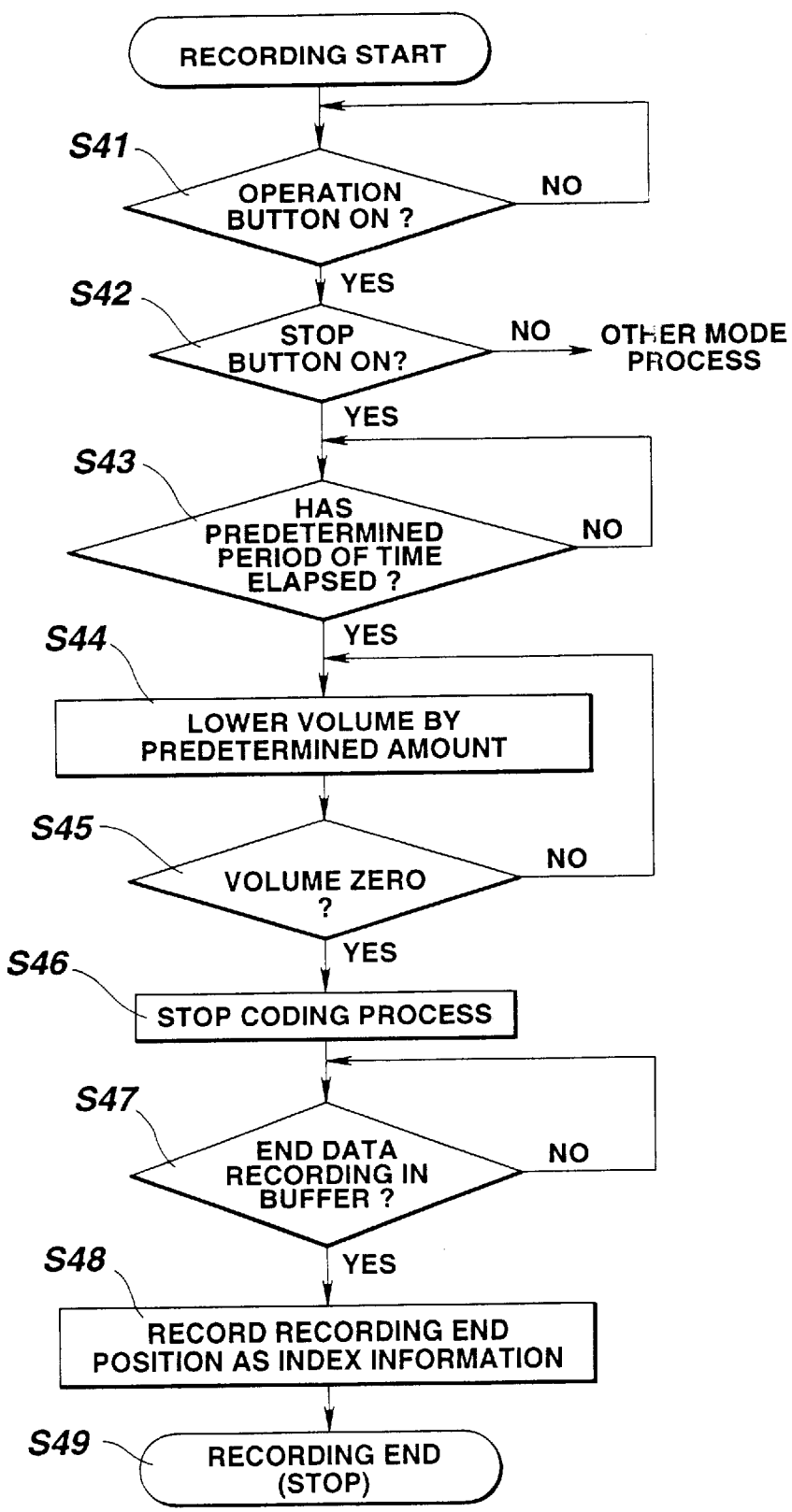
FIG. 5 is a flow chart showing a recording operation in the voice recording/reproducing apparatus according to the second embodiment.

Of the operations of the voice recording/reproducing apparatus according to the second embodiment, a recording operation will be described below with reference to the flow chart in FIG. 5.

Recording is started first.

It is detected in step S41 whether the operation buttons of the operation input unit 17 are ON during the recording process. When the operation buttons are ON, the flow is shifted to step S42.

It is detected in step S42 whether the stop button 172 of the operation buttons is ON. If NO in step S42, another mode process is started. If YES in step S42, the flow is shifted to step S43.

In step S43, when a predetermined period of time has elapsed, the flow is shifted to step S44.

In step S44, the digital signal processor 5 is controlled to lower a volume output to the storage unit 16 by a predetermined amount. The flow is shifted to step S45.

It is detected in step S45 whether the level of the volume lowered in step S44 becomes zero in comparison with the level of the input volume, i.e., whether a silent state is set. If NO in step S45, the flow returns to step S44. If YES in step S45, the flow is shifted to step S46.

In step S46, a stop coding process is performed. The flow is shifted to step S47.

In step S47, the controller waits for the end of recording of data in the I/O data buffer 10 and the data buffer 20. The flow is shifted to step S48 when recording in the buffer 20 has ended.

In step S48, a recording end position is recorded as index information. The flow is shifted to step S49.

Recording is ended in step S49, and a stop mode is set.

The above operation will be described below with reference to FIG. 2. When the stop button 172 is pressed, data obtained from the point B to the point A are stored in the data buffer 20. After data obtained from the point B to the point C are completely stored in the recording medium 14 after a predetermined period of time, from a point when coding of a digital signal obtained from the point C to the point A is ended, a recording level is gradually lowered by the digital signal processor 5. At the point A, the recording level is set to be zero.

Figure 6:
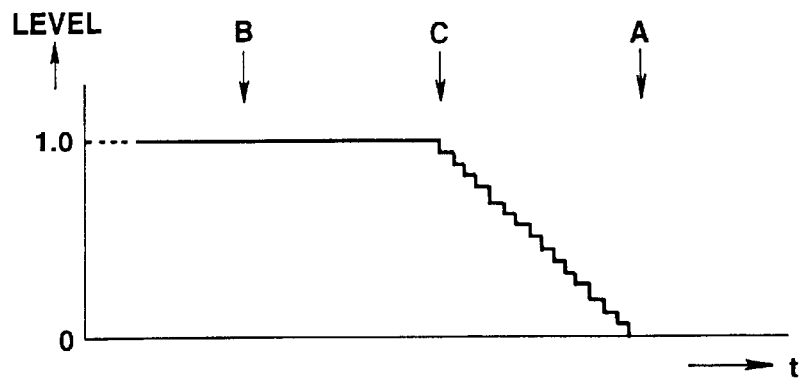
FIG. 6 is a graph showing the relationship between an elapsed time and a level corresponding to an input level in recorded contents in the voice recording/reproducing apparatus according to the second embodiment.

A change in recording level will be described below with reference to FIG. 6. A value obtained by comparing the recording level and an input level with time can be shown in the graph of FIG. 6. In the second embodiment, a fade-out operation is performed from the point C to the point A.

In this manner, according to the second embodiment, uncomfortable operation sound is reduced, and voice is not suddenly, unnaturally interrupted during a reproducing operation. For this reason, a comfortable recording/reproducing operation can be performed.

In the second embodiment, an operation of the stop button 172 in a recording operation is exemplified. However, the present invention is not limited to the second embodiment, and a case wherein a recording operation is stopped to start another mode process such as a reproducing operation in a recording operation can be exemplified in the same manner as described above.

In the second embodiment, the fade-out operation is performed from the point C to the point A in FIG. 2. However, when a reduction in uncomfortable sound is to be mainly performed, a recording level is preferably set to be zero before the point A.

The third embodiment of the present invention will be described below.

A voice recording/reproducing apparatus according to the third embodiment has the same arrangement as that of the voice recording/reproducing apparatus of the first embodiment, and has a recording operation which is partially different from that of the first embodiment. More specifically, although recording end position information is directly stored as index information in the first embodiment, the third embodiment has the following characteristic feature. That is, modified recording end position information is stored as index information.

Only the difference between the third embodiment and the first embodiment will be described below. The arrangement and the same function will be omitted.

Figure 7:
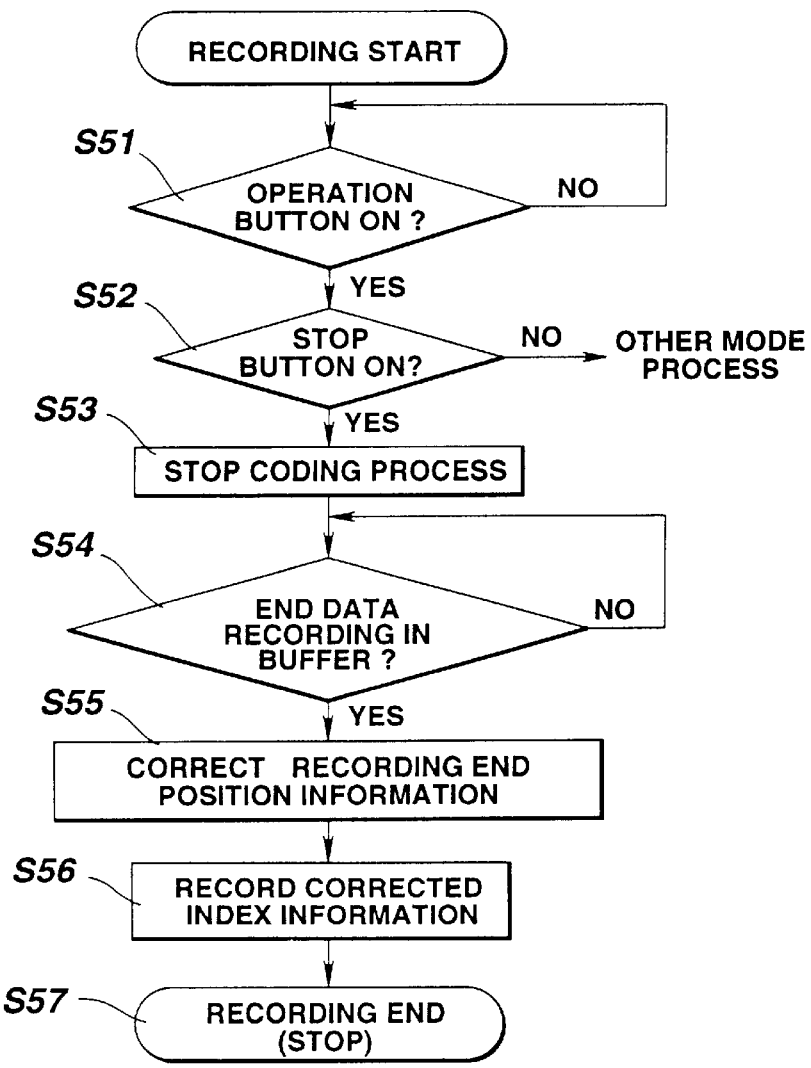
FIG. 7 is a flow chart showing a recording operation in a voice recording/reproducing apparatus according to a third embodiment of the present invention.

Of the operations of the voice recording/reproducing apparatus according to the third embodiment, a recording operation will be described below with reference to the flow chart in FIG. 7.

Recording is started first.

It is detected in step S51 whether the operation buttons of the operation input unit 17 are ON during the recording process. When the operation buttons are ON, the flow is shifted to step S52.

It is detected in step S52 whether the stop button 172 of the operation buttons is ON. If NO in step S52, another mode process is started. If YES in step S52, the flow is shifted to step S53.

In step S53, a stop coding process is performed. The flow is shifted to step S54.

In step S54, the controller waits for the end of storing of data, in the I/O data buffer 10, in the recording medium 14. The flow is shifted to step S55 when recording of data in buffer 10 ends.

In step S55, recording end position information is modified. The flow is shifted to step S56.

In step S56, the modified recording end position is recorded on the recording medium 14 as index information. The flow is shifted to step S57.

Recording is ended in step S57. A stop mode is set.

In a general device for recording voice as coded data, the recording start position information and recording end position information about respective recorded contents are stored as index information. In the third embodiment, the recording end position information is modified as if recording is ended a predetermined period of time before the recording is ended.

The above operation will be described below with reference to FIG. 2. When recording is ended at the point A, information at the point A is modified into information at the point C as recording end position information, and the modified information is recorded as index information. In a reproducing operation, since information from the point C to the point A is out of a range in which the reproducing operation is performed, the information is not reproduced. In this manner, the same effect as an effect that recording is not performed from the point C to the point A can be obtained, and uncomfortable operation sound is not reproduced.

The fourth embodiment of the present invention will be described below.

A voice recording/reproducing apparatus according to the fourth embodiment has an arrangement equivalent to the arrangement of the first embodiment, and has a reproducing operation which is partially different from that of the first embodiment. More specifically, although ordinary reproduction is performed up to the recording end position of index information in the first embodiment, the fourth embodiment has the following characteristic feature. That is, a reproducing volume is changed from a time before a recording end position.

Therefore, only the difference point between the fourth embodiment and the first embodiment will be described below. A description of the arrangement and the same functions will be omitted.

Figure 8:
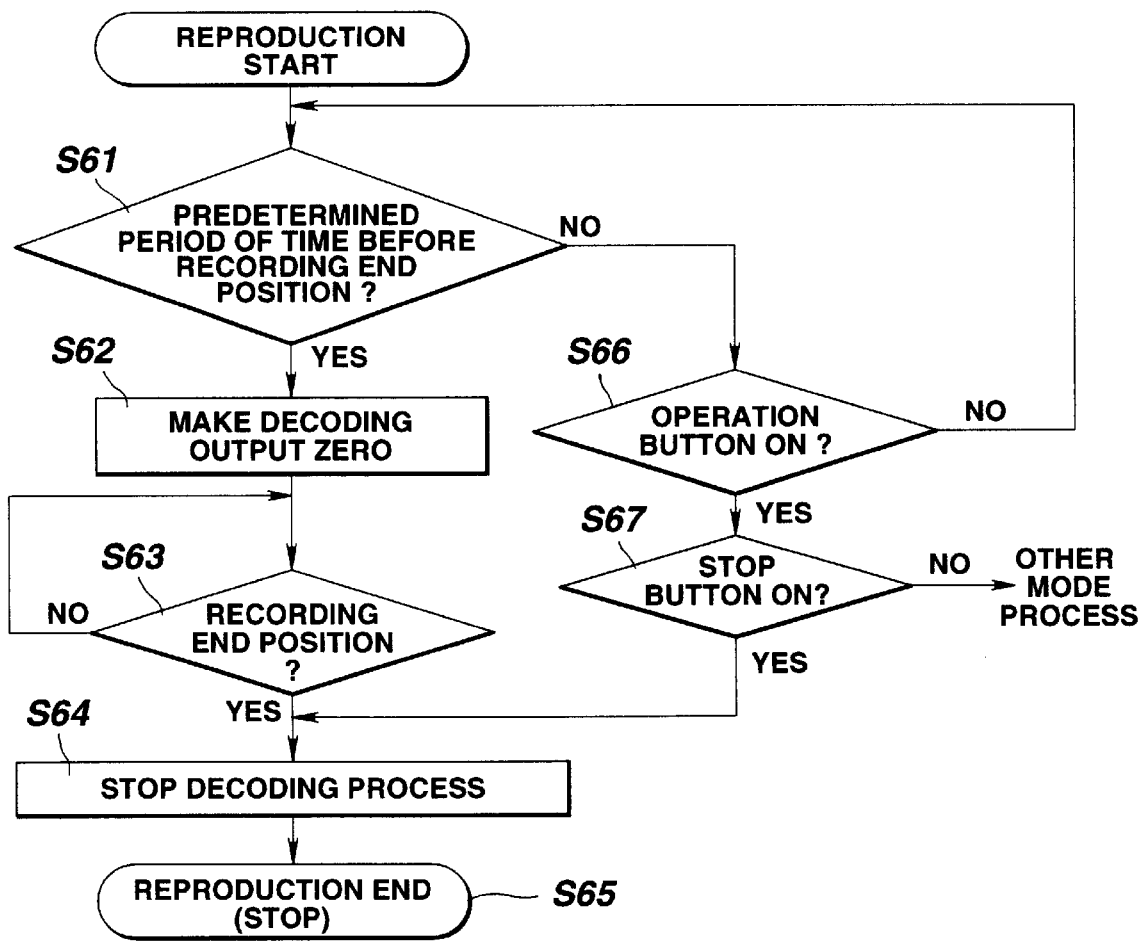
FIG. 8 is a flow chart showing a reproducing operation in a voice recording/reproducing apparatus according to a fourth embodiment of the present invention.

Of the operations of the voice recording/reproducing apparatus according to the fourth embodiment, a reproducing operation will be described below with reference to the flow chart in FIG. 8.

A reproducing operation is started first.

It is detected in step S61 whether the position is a predetermined period of time before a recording end position during the reproducing operation. If YES in step S61, the flow is shifted to step S62.

In step S62, a decoded output in the digital signal processor 5 is set to be zero. This means that a digital signal which is analog-converted by the D/A converter 6 to be zero is output. The flow is shifted to step S63.

In step S63, the controller waits until recording data is read up to the recording end position. Meantime, a reproduced output is zero. The flow is shifted to step S64.

After a decoding process is stopped in step S64, the reproducing operation is ended in step S65.

If a NO condition is present in step S61, it is detected in step S66 whether the operation buttons of the operation input unit 17 are ON. If NO in step S66, the flow is shifted to step S61. If YES in step S66, the flow is shifted to step S67.

It is detected in step S67 whether the stop button 172 of the operation buttons is ON. If NO in step S67, another mode process is started. When the stop button 172 is ON, the flow is shifted to step S64.

This operation will be described below with reference to FIG. 2. Upon completion of the recording operation, when the recording end position information is set at a position corresponding to the point A, a reproducing volume is sharply lowered from a time when a reproducing operation is performed up to the point C immediately before the point A. In this manner, in a period of time from the point C to the point A, uncomfortable operation sound can be prevented from being reproduced, or can be reduced.

As described above, according to the fourth embodiment, uncomfortable operation sound can be prevented from being reproduced in reproduction without processing coded voice data, and uncomfortability can be reduced.

The fifth embodiment of the present invention will be described below.

A voice recording/reproducing apparatus according to the fifth embodiment has the same arrangement as that of the fourth embodiment, and has a reproducing operation which is partially different from that of the fourth embodiment.

More specifically, although a reproducing volume is sharply lowered immediately before the recording end position information, the fifth embodiment has the following characteristic feature. That is, a reproducing volume is gradually lowered.

Therefore, only the difference point between the fifth embodiment and the fourth embodiment will be described below. A description of the arrangement and the same function will be omitted.

Figure 9:
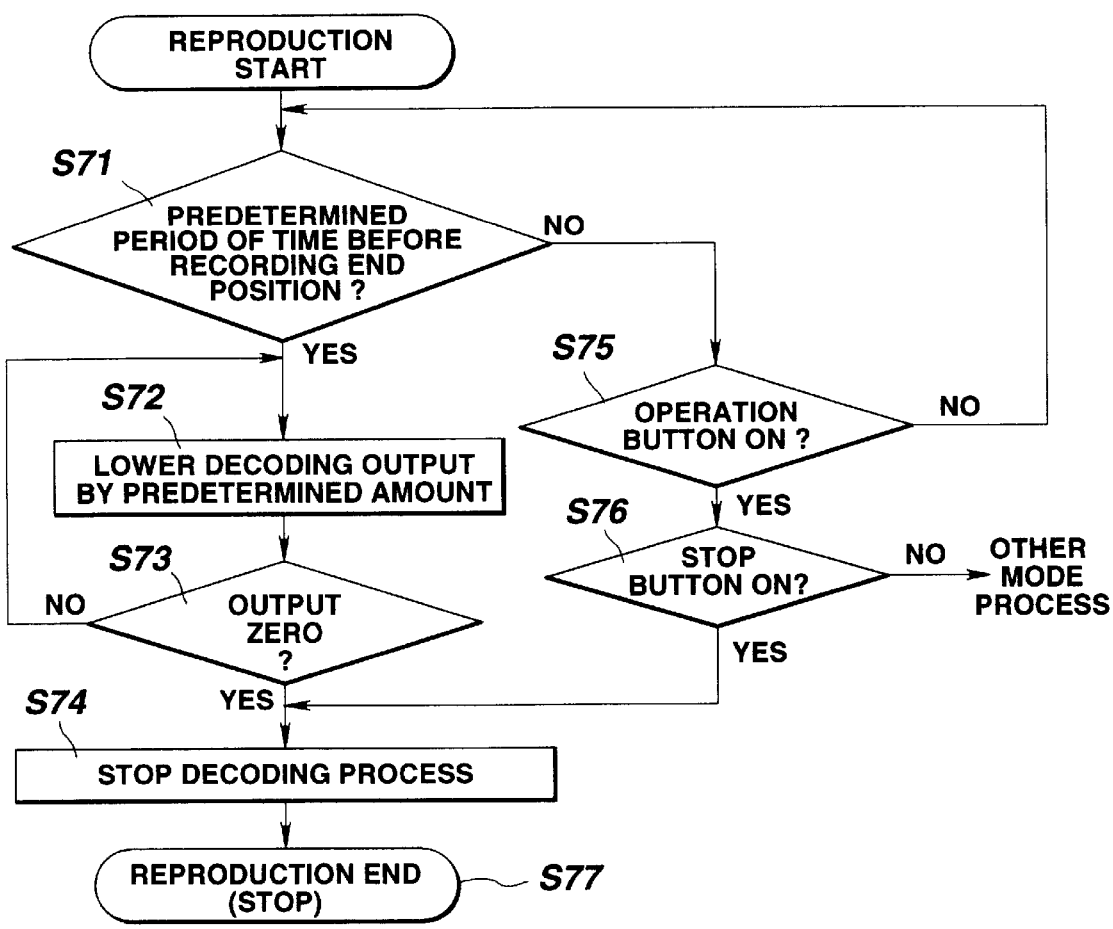
FIG. 9 is a flow chart showing a reproducing operation in a voice recording/reproducing apparatus according to a fifth embodiment of the present invention.

Of the operations of the voice recording/reproducing apparatus according to the fifth embodiment, a reproducing operation will be described below with reference to the flow chart FIG. 9.

A reproducing operation is started first.

It is detected in step S71 whether the position is a predetermined period of time before a recording end position during the reproducing operation. If YES in step S71, the flow is shifted to step S72.

In step S72, a decoded output in the digital signal processor 5 is lowered by a predetermined amount. This means that a digital signal which is analog-converted by the D/A converter 6 to be zero is output. The flow is shifted to step S73.

It is detected in step S73 whether the output is zero. If NO in step S73, the flow returns to step S72. If YES in step S73, the flow is shifted to step S74.

After a decoding process is stopped in step S74, the flow is shifted to step S77.

In step S77, the reproducing operation is ended.

If a NO condition is present in step S71, it is detected in step S75 whether the operation buttons of the operation input unit 17 are ON. If NO in step S75, the flow is shifted to step S71. If YES in step S75, the flow is shifted to step S76.

It is detected in step S76 whether the stop button 172 of the operation buttons is ON. If NO in step S76, another mode process is started. When the stop button 172 is ON, the flow is shifted to step S74.

A change in recording level will be described below with reference to FIG. 6. A value obtained by comparing the recording level and an input level with time can be shown in the graph of FIG. 6. Referring to FIG. 6, a constant value is kept from the point B to the point C, a value is gradually lowered from the point C to the point A.

In this manner, according to the fifth embodiment, uncomfortable operation sound is reduced without processing coded voice data recorded, and voice is not suddenly, unnaturally interrupted during a reproducing operation. For this reason, a comfortable recording/reproducing operation can be performed.

In this embodiment, although the digital signal processor 5 is supposed to be controlled as a means for reducing reproduced voice, the D/A converter 6 may be controlled.

The sixth embodiment of the present invention will be described below.

A voice recording/reproducing apparatus according to the sixth embodiment has the following characteristic feature. As in the fourth or fifth embodiment, a volume level is adjusted in a reproducing operation to reduce uncomfortable operation sound without processing recorded coded voice data.

Figure 10:
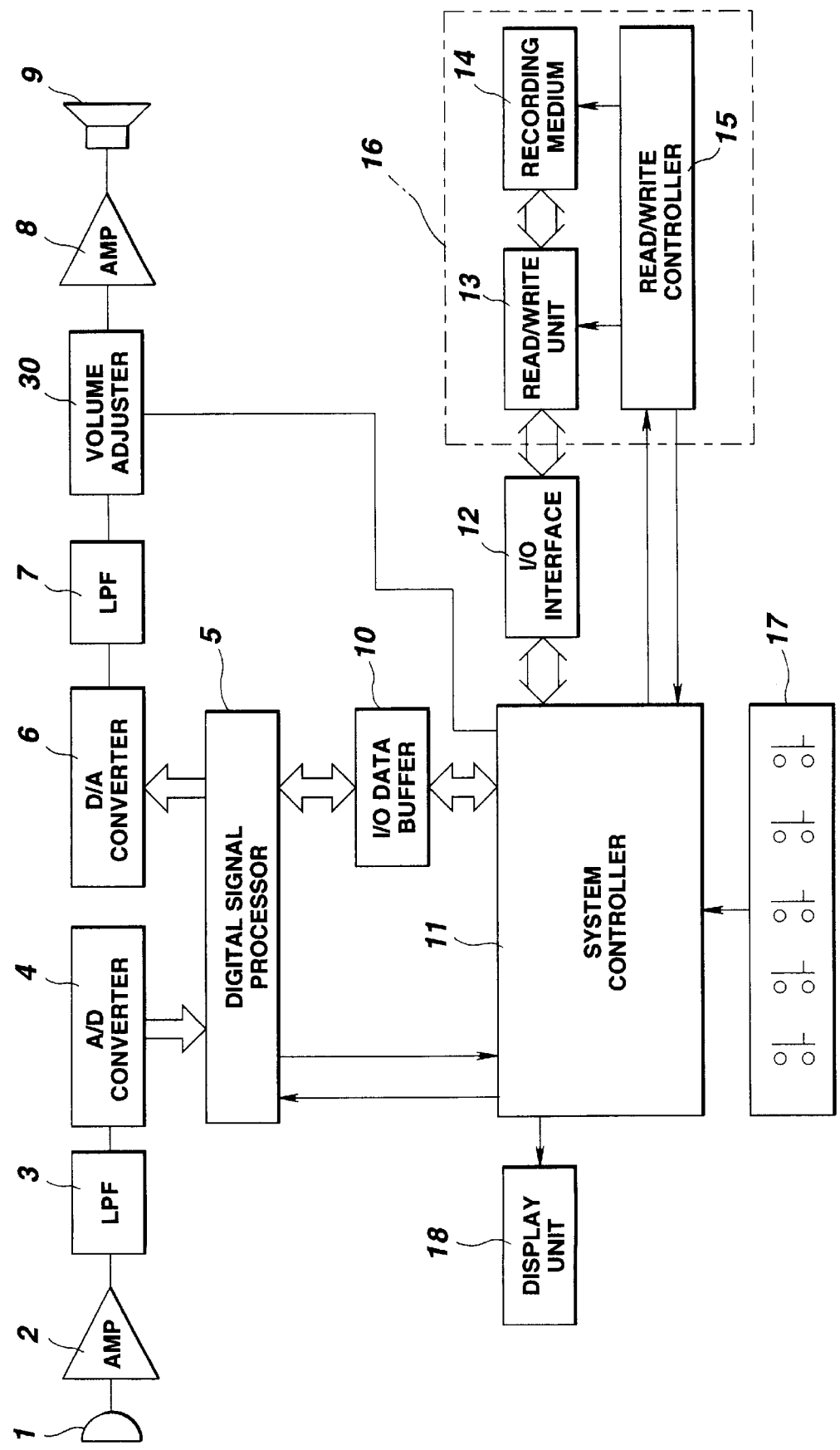
FIG. 10 is a block diagram showing the arrangement of a voice recording/reproducing apparatus according to a sixth embodiment of the present invention.

FIG. 10 is a block diagram showing the arrangement of a voice recording/reproducing apparatus according to the sixth embodiment of the present invention. The arrangement of the sixth embodiment is obtained by adding a volume adjuster 30 between the low-pass filter 7 and the power amplifier 8 in the arrangement of the first embodiment. The same reference numerals as in the first embodiment denote the same parts in the sixth embodiment, and a description thereof will be omitted.

The volume adjuster 30 is controlled by the system controller 11 to lower the volume of a D/A-converted voice signal by predetermined amounts and to adjust the volume to zero.

Figure 11:
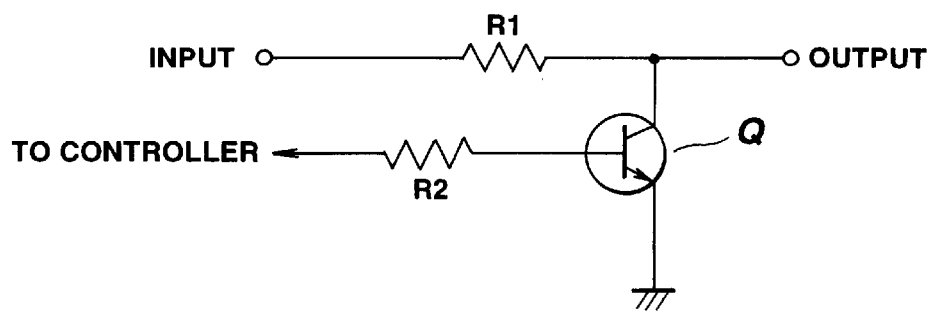
FIG. 11 is an electrical circuit diagram showing the arrangement of a volume adjusting means in the voice recording/reproducing apparatus according to the sixth embodiment.

The volume adjuster 30 will be described below with reference to the electric circuit diagram in FIG. 11.

The volume adjuster 30 is constituted by a muting circuit including resisters R1 and R2 and a transistor Q.

Of operations of the voice recording/reproducing apparatus according to the sixth embodiment, a reproducing operation will be described below.

The reproducing operation in the sixth embodiment is the same as that in the fourth or fifth embodiment. More specifically, when the same operation as that in the fourth embodiment, a reproducing volume is sharply lowered at the point immediately before a recording end position. Since the flow chart of this operation is the same as that of the operation in the fourth embodiment, a description of the flow chart is omitted. When the same operation as that in the fifth embodiment is performed, a reproducing volume is gradually lowered from a point immediately before the recording end position. Since the flow chart of this operation is the same as the of the operation in the fifth embodiment, a description of the flow chart is omitted.

As described above according to the sixth embodiment, when the same operation as that in the fourth embodiment is performed, uncomfortable operation sound is prevented from being reproduced in a reproducing operation without processing coded voice data recorded, and uncomfortability can be reduced.

When the same operation as that in the fifth embodiment is performed, reproduction of uncomfortable operation sound is reduced without processing coded voice data recorded, and voice is not suddenly, unnaturally interrupted during a reproducing operation. For this reason, a comfortable recording/reproducing operation can be performed.

In the sixth embodiment, although a muting circuit is supposed as the volume adjuster 30, an electronic volume may be employed as the volume adjuster 30.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. A voice recording/reproducing apparatus comprising:

A/D converting means for converting an input analog voice signal during a voice recording mode into a digital signal;

digital signal processing means for coding the converted digital signal in a predetermined format and decoding the coded voice data;

a recording medium for storing the coded voice data;

D/A converting means for converting the decoded digital signal into an analog voice signal;

operation means for setting a predetermined operating mode from one of a plurality of operating modes including at least a mode and a stop recording mode;

a data buffer for temporarily storing the coded voice data before the coded voice data is stored in said recording medium; and control means responsive to a stop recording mode operation for reducing noise during subsequent reproduction of the voice data by modifying voice data in said data buffer obtained over a period of time before the operation means sets the stop recording mode.

2. A voice recording/reproducing apparatus comprising:

an A/D converter receiving an input analog voice signal to be recorded and converting the analog voice signal into a digital signal;

a digital signal processor coding the converted digital signal into a predetermined format and decoding the coded voice signal;

a recording medium for storing the coded voice signal;

a D/A converter converting the decoded digital voice signal into an analog voice signal;

a setting device for selecting a predetermined operating mode from one of a plurality of operating modes including at least a recording mode and a reproducing mode; and a controller for reducing noise caused when a recording operation in process is stopped said controller being responsive to a recording operation being stopped for altering a voice signal before it is transferred to the recording medium to prevent said noise from being reproduced during a reproducing operation and;

a data buffer for temporarily storing coded voice data before the coded voice data is stored in said recording medium, wherein said controller performs said noise altering operation upon voice data in said data buffer, to substantially prevent said noise from being read into said recording medium, said controller transferring the voice data to said recording medium.

3. The apparatus according to claim 2, wherein said controller stops an operation of storing voice data, which is in said data buffer and obtained from a predetermined period of time before said setting device performing the recording stop operation to a time when said setting device performing the recording stop operation in said recording medium.

4. The apparatus according to claim 2, wherein said data buffer temporarily stores the digital voice signal converted by said A/D converter before the digital voice signal is inputted to said digital signal processor, wherein said controller controls said digital signal processor to gradually lower a storing level of coded voice data by performing a predetermined process on a digital signal, which is in said data buffer, said process being initiated on a part of said digital signal which occurred a predetermined period of time before said setting device performing the recording stop operation to a time when said setting device performing the recording stop operation to reduce the storing level of the coded voice data in said recording medium to zero.

5. The apparatus according to claim 4, wherein a period of time required to set the storing level of the coded voice data in said recording medium to be zero is set to be shorter than the predetermined period of time before said controller receives an output from the setting device that the recording stop operation was performed.

6. The apparatus according to claim 2, further comprising a position information recorder for recording predetermined position information of the coded voice data in said recording medium, wherein said controller modifies position information obtained when said controller receives an output from the setting device that a stop operation was performed by said setting device during a recording operation, and uses the modified position information as recording end position information.

7. The apparatus according to claim 6, wherein position information obtained a predetermined period of time before said controller receives an output from the setting device that the recording end operation is performed is set as recording end position information.

8. The apparatus according to claim 2, further comprising a position information recorder recording predetermined position information of the coded voice data in said recording medium, wherein, during a reproducing operation, said controller reproduces voice data obtained from a position a predetermined period of time before the recording end position to the recording end position while lowering a volume of the voice data to zero.

9. The apparatus according to claim 8, wherein, of the reproduced voice data, voice data obtained from a position before the predetermined period of time before the recording end position to the recording end position is reproduced while setting a volume level of the voice data.

10. The apparatus according to claim 8, wherein, of the reproduced voice data, voice data obtained from a position before the predetermined period of time before the recording end position to the recording end position is reproduced while gradually lowering a volume level of the voice data to zero.

11. The apparatus according to claim 9, wherein, in order to set the volume level to be zero, said controller controls said digital signal processor to set a decoded output to be zero.

12. The apparatus according to claim 10, wherein, in order to gradually lower the volume level, said controller controls said digital signal processor to gradually lower a decoded output.

13. A voice recording/reproducing apparatus comprising:

a device for converting an input analog voice signal into a digital signal;

a digital signal processor for coding the converted digital signal in a predetermined format and decoding the coded voice data;

a recording medium for storing the coded voice data;

a device for converting the decoded digital signal into an analog voice signal;

an operation device for setting a predetermined mode;

a data buffer for temporarily storing the coded voice data before the coded voice data is stored in said recording medium; and a controller which reduces noise during a reproducing operation of the voice data in a part of the voice data obtained starting a predetermined period of time before said operation device receives an output from the operation device that a recording stop operation was performed by said operation device during a recording operation of said voice data to a time when said operation device performs the recording stop operation was performed.

14. A method for preventing the occurrence of noise in a playback operation of a recording/playback device, such noise being caused by stopping of a recording operation in process, said device having a buffer memory and a recording medium, said method comprising the steps of:

(a) converting a voice signal to be recorded, and which is in an analog format, to a digital voice format;

(b) identifying a position in said voice signal when a recording operation of said voice signal is stopped;

(c) initially storing the voice signal in a buffer memory;

(d) altering a part of the digital voice format signal in said buffer memory starting at a predetermined time prior to said identified position to reduce noise in said altered part; and (e) transferring said digital voice format signal, including said altered part, to said recording medium.

15. The method of claim 14 further comprising:

(f) reading the digital voice format signal from said recording medium; and (g) converting the digital voice format signal into an analog voice format signal, whereby a noise in said altered part is reduced.

16. The method of claim 15 wherein a volume control device is operated to reduce a volume of said analog voice format signal, generated during step (g), occurring during said altered part to zero responsive to detection of said altered part.

17. The method of claim 14 further comprising:

(f) reading the digital voice format signal from said recording medium; and (g) converting the digital voice format signal into an analog voice format signal, whereby a noise in said altered part is eliminated.

18. The method of claim 14 wherein step (d) further comprises;

gradually reducing the voice signal during a period starting at said predetermined time to at least a time represented by said identified position.

19. A method for preventing the occurrence of noise in a playback operation of a recording/playback device, such noise being caused by stopping of a recording operation in process, said device having a buffer storage device and a recording medium, said method comprising the steps of:

(a) converting a voice signal to be recorded, and which is in an analog format, to a digital voice format;

(b) storing the digital voice signal in the buffer storage device;

(c) identifying a position in said voice signal when a recording operation of said voice signal is stopped;

(d) altering a part of the digital voice format signal in the buffer storage device starting at a predetermined time prior to said identified position to reduce noise in said altered part; and (e) transferring said digital voice format signal, including said altered part, from said buffer storage device to said recording medium.

20. The method of claim 19 wherein step (d) comprises:

altering a part of the digital voice by gradually lowering said signal in the buffer storage to reduce noise.

21. The method of claim 20 wherein the storing level is lowered to zero, and the time required to lower the storing level to zero is set shorter than the predetermined period of time before said controller sets the stop record mode.

22. A method for preventing the occurrence of noise in a playback operation of a recording/playback device, such noise being caused by stopping of a recording operation in process, said device having a buffer storage device and a recording medium, said method comprising the steps of:

(a) converting a voice signal to be recorded, and which is in an analog format, to a digital voice format;

(b) storing the digital voice format signal in the buffer storage device;

(c) identifying a position in said voice signal when a recording operation of said voice signal is stopped; and (d) transferring said digital voice format signal to the recording medium except a part of the digital voice format signal in the buffer storage device starting at a predetermined time prior to said identified position.

* * * * *